(12) United States Patent
Yeh et al.

(10) Patent No.: US 11,906,895 B2
(45) Date of Patent: Feb. 20, 2024

(54) METHOD AND SYSTEM FOR BLENDING IMAGES CAPTURED UNDER DIFFERENT STROBE CONDITIONS

(71) Applicant: MEDIATEK INC., Hsin-Chu (TW)

(72) Inventors: Po-Yu Yeh, Hsinchu (TW);
Shao-Hsiang Chang, Hsinchu (TW);
Chia-Ping Chen, Hsinchu (TW);
Keh-Tsong Li, Hsinchu (TW);
Gang-Wei Fan, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 211 days.

(21) Appl. No.: 17/483,820

(22) Filed: Sep. 24, 2021

(65) Prior Publication Data

US 2022/0107550 A1 Apr. 7, 2022

Related U.S. Application Data

(60) Provisional application No. 63/087,926, filed on Oct. 6, 2020.

(51) Int. Cl.
| | |
|---|---|
| H04N 5/235 | (2006.01) |
| G03B 7/16 | (2021.01) |
| G03B 15/05 | (2021.01) |
| H04N 23/74 | (2023.01) |

(52) U.S. Cl.
CPC .............. *G03B 7/16* (2013.01); *G03B 15/05* (2013.01); *H04N 23/74* (2023.01)

(58) Field of Classification Search
None
See application file for complete search history.

(56) References Cited

U.S. PATENT DOCUMENTS

| | | | |
|---|---|---|---|
| 2008/0151101 A1* | 6/2008 | Tian | H04N 7/0115 348/448 |
| 2009/0284613 A1* | 11/2009 | Kim | H04N 13/122 348/222.1 |
| 2010/0080459 A1* | 4/2010 | Dai | G06T 5/009 382/170 |
| 2012/0002898 A1 | 1/2012 | Cote | |
| 2015/0063694 A1* | 3/2015 | Shroff | G06T 11/60 382/167 |
| 2015/0092073 A1* | 4/2015 | Park | H04N 5/2625 348/222.1 |
| 2016/0203124 A1* | 7/2016 | Cuthbert | G06F 40/51 704/2 |
| 2017/0180691 A1* | 6/2017 | Sunkavalli | H04N 9/73 |
| 2017/0324909 A1* | 11/2017 | Choi | G06T 7/11 |
| 2018/0359410 A1* | 12/2018 | Ain-Kedem | G06T 1/20 |
| 2019/0035062 A1* | 1/2019 | Sokeila | H04N 5/2621 |
| 2020/0104695 A1* | 4/2020 | Laaksonen | G06N 3/08 |
| 2020/0240840 A1* | 7/2020 | Darty | G01J 3/0264 |
| 2020/0267299 A1* | 8/2020 | Le | G06T 5/009 |

* cited by examiner

*Primary Examiner* — Mohammad J Rahman
(74) *Attorney, Agent, or Firm* — Winston Hsu

(57) ABSTRACT

An image capture method for flash photography includes: capturing at least one first image while a strobe device is operating under a first strobe intensity setting for emitting main flash, capturing at least one second image while the strobe device is operating under a second strobe intensity setting different from the first strobe intensity setting, and generating an output image by blending the at least one first image and the at least one second image.

18 Claims, 6 Drawing Sheets

(A)

(B)

METHOD AND SYSTEM FOR BLENDING IMAGES CAPTURED UNDER DIFFERENT STROBE CONDITIONS

CROSS REFERENCE TO RELATED APPLICATIONS

This application claims the benefit of U.S. provisional application No. 63/087,926, filed on Oct. 6, 2020 and incorporated herein by reference.

BACKGROUND

The present invention relates to flash photography, and more particularly, to a method and system for blending images captured when a strobe device is operating under different strobe intensity settings such as a "MAIN FLASH ON" mode and a "MAIN FLASH OFF" mode.

Conventional flash photography in a low light environment may obtain a captured image with a bright foreground illuminated by the flash and a dim background with insufficient ambient light. Adjusting the exposure setting to achieve a fine lighting condition in either part will ruin the other part, such as a fine foreground with an underexposed background or a fine background with an overexposed foreground. Moreover, the conventional flash photography faces a dilemma of choosing a high strobe intensity with a fast shutter speed or a low strobe intensity with a slow shutter speed. The former results in a motionless, ill-exposed image, while the latter gets a well-exposed image with motion blur.

Thus, there is a need for an innovative flash capture solution that can get a well-lit image in both foreground and background, and can also solve the motion blur issue.

SUMMARY

One of the objectives of the claimed invention is to provide a method and system for blending images captured when a strobe device is operating under different strobe intensity settings such as a "MAIN FLASH ON" mode and a "MAIN FLASH OFF" mode.

According to a first aspect of the present invention, an exemplary image capture method for flash photography is disclosed. The exemplary image capture method includes: capturing at least one first image while a strobe device is operating under a first strobe intensity setting for emitting main flash; capturing at least one second image while the strobe device is not emitting the main flash; and generating an output image by blending the at least one first image and the at least one second image.

According to a second aspect of the present invention, an exemplary image capture system for flash photography is disclosed. The exemplary image capture system includes a strobe device, an image capture circuit, and a data processing circuit. The image capture circuit is arranged to capture at least one first image while the strobe device is operating under a first strobe intensity setting for emitting main flash, and capture at least one second image while the strobe device is operating under a second strobe intensity setting different from the first strobe intensity setting. The data processing circuit is arranged to generate an output image by blending the at least one first image and the at least one second image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
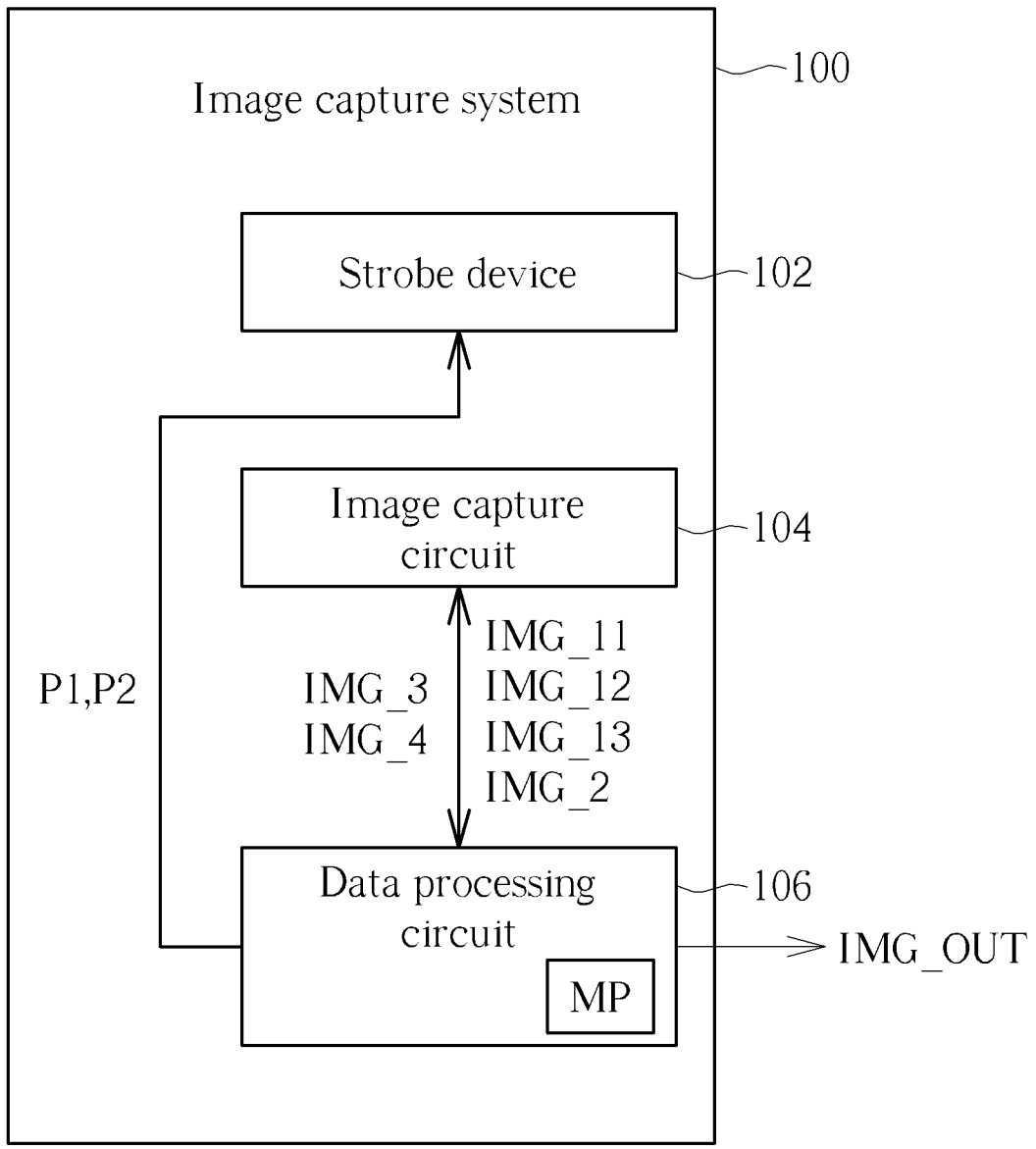
FIG. 1 is a diagram illustrating an image capture system for flash photography according to an embodiment of the present invention.

FIG. 1 is a diagram illustrating an image capture system for flash photography according to an embodiment of the present invention. The image capture system 100 includes a strobe device 102, an image capture circuit 104, and a data processing circuit 106. The strobe device 102 is arranged to emit light during a pre-flash phase, and is further arranged to emit light during a main flash phase following the pre-flash phase. The image capture circuit 104 includes elements required to perform an image capture function. For example, the image capture circuit 104 may include a camera module and an image signal processor (ISP). The image capture circuit 104 is arranged to capture a plurality of images for the same scene during each of the pre-flash phase and the main flash phase, where the images include at least one image captured while the strobe device 102 is operating under one strobe intensity setting and at least one image captured while the strobe device 102 is operating under a different strobe intensity setting. For example, the image capture circuit 104 may capture at least one image under a "PRE-FLASH ON" mode and at least one image under a "PRE-FLASH OFF" mode, and may further capture at least one image under a "MAIN FLASH ON" mode and at least one image under a "MAIN FLASH OFF" mode. The data processing 106 is arranged to generate an output image IMG_OUT by blending images captured during the main flash phase, and is further arranged to process images captured during the pre-flash phase for controlling the image capture operation performed during the main flash phase and the following blending operation applied to the images captured during the main flash phase.

Figure 2:
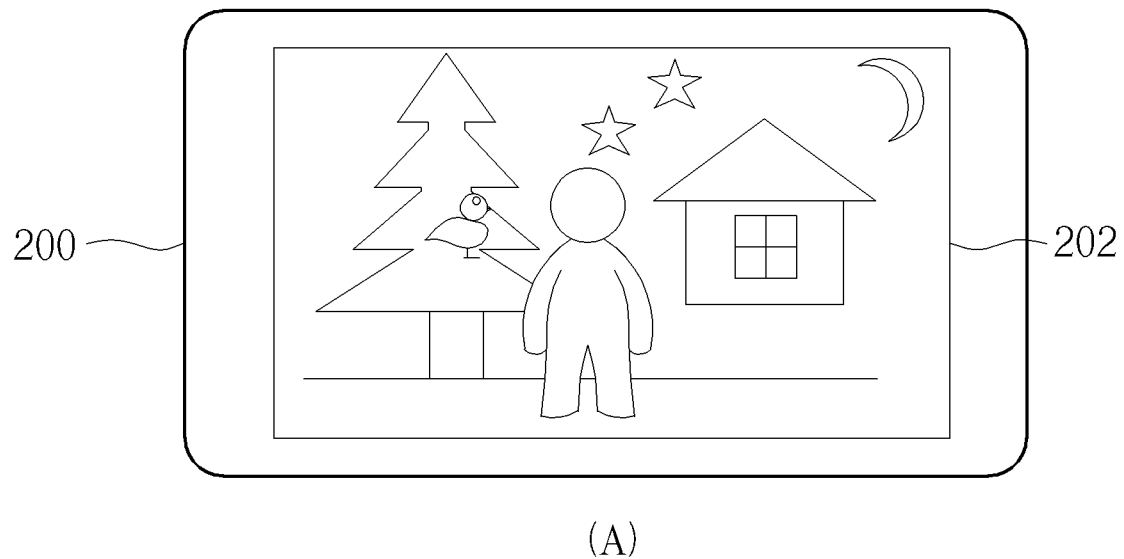
FIG. 2 is a diagram illustrating a smartphone using the image capture system shown in FIG. 1 according to an embodiment of the present invention.
Figure 2:
Figure 3:
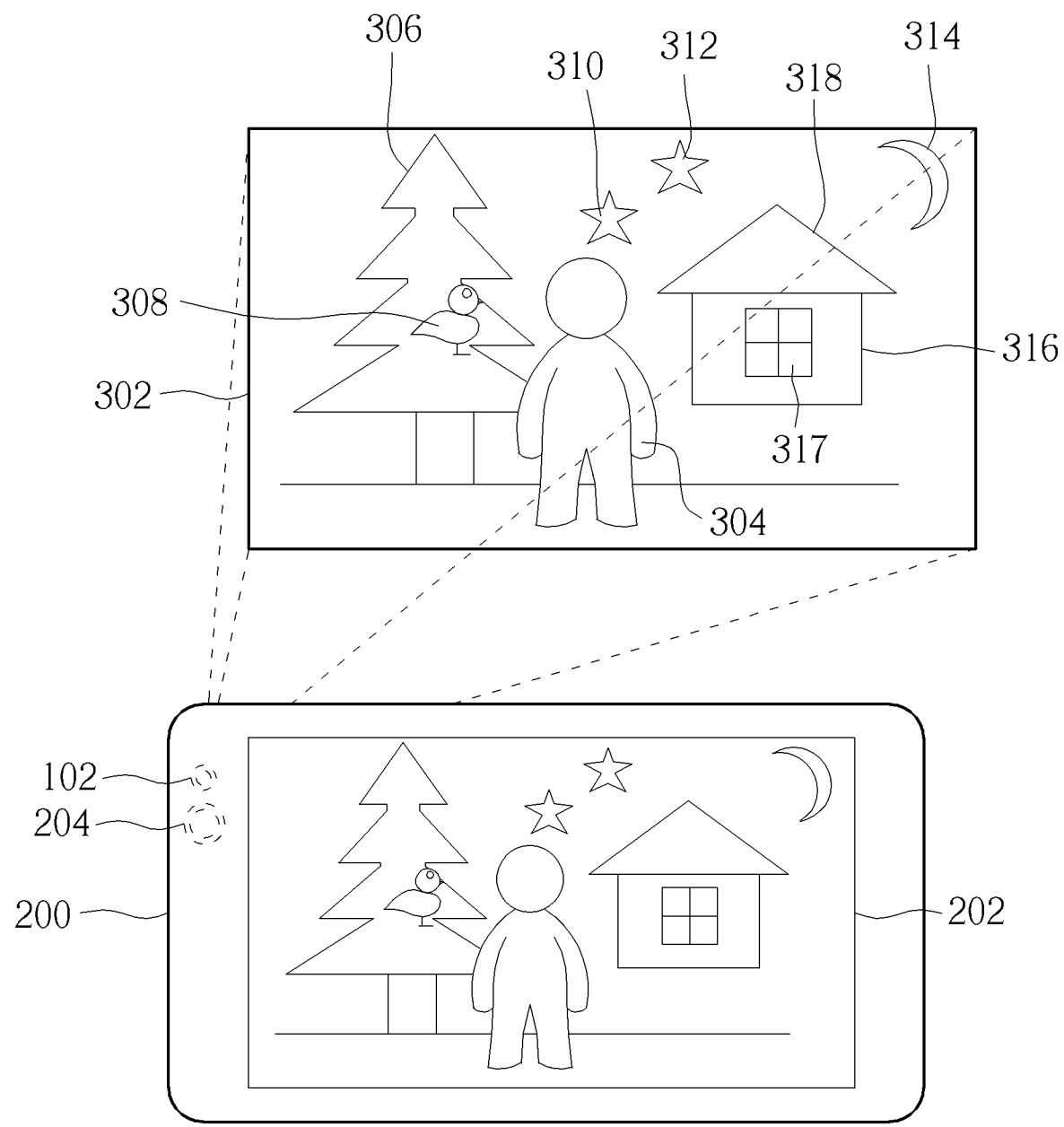
FIG. 3 is a diagram illustrating flash photography performed upon a low light scene by the smartphone shown in FIG. 2 according to an embodiment of the present invention.

By way of example, but not limitation, the image capture system 100 may be employed by a portable electronic device, such as a smartphone, a digital camera, or a tablet. FIG. 2 is a diagram illustrating a smartphone using the proposed image capture system 100 shown in FIG. 1 according to an embodiment of the present invention. The sub-diagram (A) of FIG. 2 illustrates a front side of the smartphone 200. The smartphone 200 has a display screen 202. The display screen 202 can be used to show a preview image before the user taps a shutter button in a user interface also shown on the display screen 202, and can be used to show a captured image generated in response to user's action of tapping the shutter button in the user interface. The sub-diagram (B) of FIG. 2 illustrates a back side of the smartphone 200, where the smartphone 200 has the strobe device 102 and a camera module 204 (which may be regarded as a part of the image capture circuit 104). The user may use the smartphone 200 to perform flash photography upon a low light scene 302 having a foreground object 304 and a plurality of background objects 306, 308, 310, 312, 314, and 316, as illustrated in FIG. 3. Regarding the background object 316, it may include a bright part 317 and a dim part 318.

The image capture system 100 provides the smartphone 200 with a flash capture solution that is capable of generating and outputting a high dynamic range (HDR) image with low motion blur. Further details of the proposed flash capture solution are described as below, with reference to the accompanying drawings.

Figure 4:
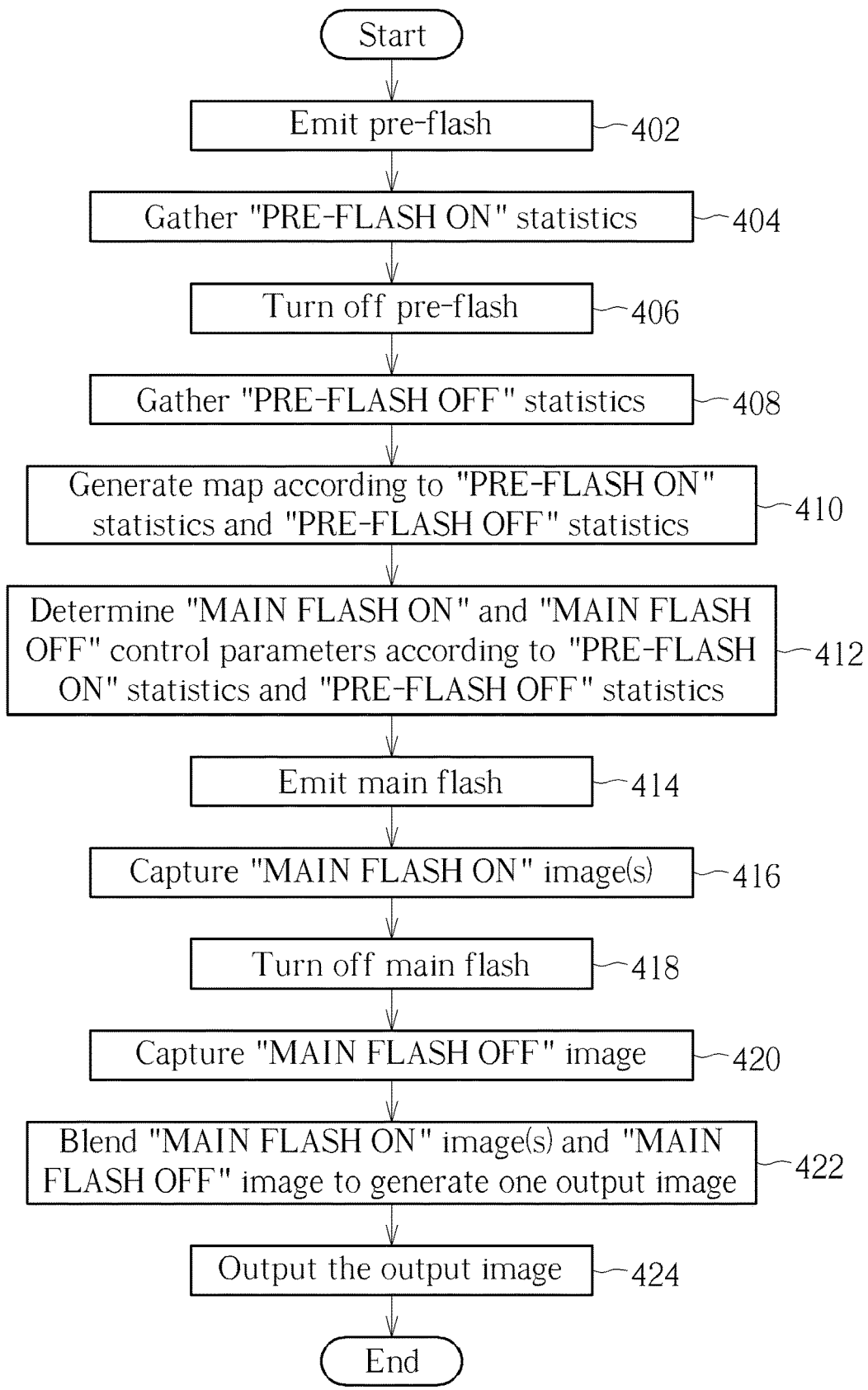
FIG. 4 is a flow chart illustrating an image capture method for flash photography according to an embodiment of the present invention.

Please refer to FIG. 1 in conjunction with FIG. 4. FIG. 4 is a flow chart illustrating an image capture method for flash photography according to an embodiment of the present invention. The image capture method may be employed by the image capture system 100 shown in FIG. 1. Provided that the result is substantially the same, the steps are not required to be executed in the exact order shown in FIG. 4.

Figure 5:
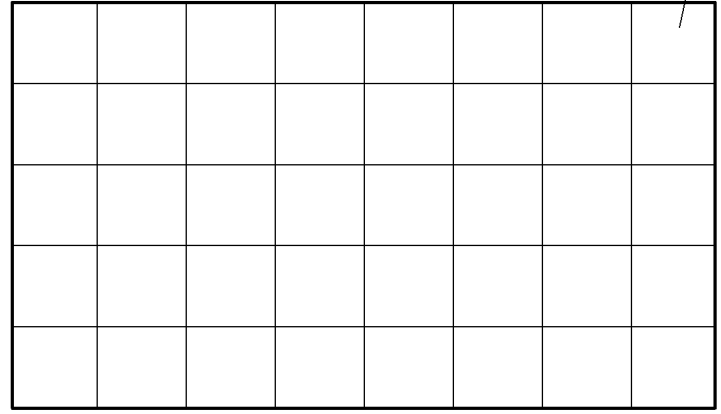
FIG. 5 is a diagram illustrating image statistics gathered from one captured image according to an embodiment of the present invention.

At step 402, the strobe device 102 operates under a strobe intensity setting S1 for emitting pre-flash. That is, a "PRE-FLASH ON" mode is enabled. At step 404, the image capture circuit 104 captures at least one image (e.g., IMG_3) while the strobe device 102 is emitting the pre-flash, and the data processing circuit 106 analyzes the captured image IMG_3 to obtain image statistics of the captured image IMG_3. FIG. 5 is a diagram illustrating image statistics gathered from one captured image according to an embodiment of the present invention. The gathered image statistics may be regarded as an image with information at different pixel locations. For example, an intensity $I_i$ of each pixel located at a pixel located i is obtained from an ambient-reflection coefficient $Ka_i$ and an intensity of ambient light $Ia_i$. The image statistics gathered from one captured image may include the intensity $I_i$ per pixel.

At step 406, the strobe device 102 operates under a strobe intensity setting S2 that is different from the strobe intensity setting S1. For example, a "PRE-FLASH OFF" mode is enabled, and the strobe device 102 does not emit light. Specifically, the strobe device 102 does not emit the pre-flash due to the strobe intensity setting S2 being a zero value. At step 408, the image capture circuit 104 captures at least one image (e.g., IMG_4) while the strobe device 102 is operating under the strobe intensity setting S2 (e.g., "PRE-FLASH OFF" mode), and the data processing circuit 106 analyzes the captured image IMG_4 to obtain image statistics of the captured image IMG_4.

By way of example, but not limitation, the image statistics gathered at step 404 and 408 may include an intensity value, a saturation value, a hue value, a color space value, a brightness value, an RGB color value, a luminance value, a chrominance value, or a combination thereof.

At step 410, the data processing circuit 106 refers to image statistics of the image IMG_3 (which may be obtained under "PRE-FLASH ON" mode) and image statistics of the image IMG_4 (which may be obtained under "PRE-FLASH OFF" mode) to create a map MP that is later used by a blending process for HDR image generation. By way of example, but not limitation, the map MP may be a depth map which includes depth information of each pixel location, a reflection map which includes ambient reflection information of each pixel location, an intensity map which includes intensity information of each pixel location, or a flow map which includes motion information of each pixel location.

At step 412, the data processing circuit 106 refers to image statistics of the image IMG_3 (which may be obtained under "PRE-FLASH ON" mode) and image statistics of the image IMG_4 (which may be obtained under "PRE-FLASH OFF" mode) to determine at least one control parameter (e.g., P1) for one flash mode (e.g., "MAIN FLASH ON" mode) and at least one control parameter (e.g., P2) for another flash mode (e.g., "MAIN FLASH OFF" mode). Byway of example, but not limitation, the control parameters P1 and P2 may include at least one of an exposure, a gain (e.g., an image sensor gain or an image signal processor (ISP) gain), a strobe intensity, a strobe color, and a strobe time.

In some embodiments of the present invention, the control parameter(s) P1/P2 may be derived from the following illumination equation expression:

$$I = Ka * Ia,$$

where I is an intensity under "PRE-FLASH ON"/"PRE-FLASH OFF", Ia is an intensity of ambient light, and Ka is an ambient-reflection coefficient.

The value of Ka can be obtained from the ratio of I and Ia. After that, the intensity of "MAIN FLASH ON" can be estimated based on Ka obtained from "PRE-FLASH ON", and the intensity of "MAIN FLASH OFF" can be estimated based on Ka obtained from "PRE-FLASH OFF".

At step 414, the strobe device 102 operates under a strobe intensity setting S3 for emitting main flash. That is, a "MAIN FLASH ON" mode is enabled. At step 416, the image capture circuit 104 captures at least one image (e.g., multiple images IMG_11, IMG_12, and IMG_13) while the strobe device 102 is emitting the main flash, where capture of the images IMG_11, IMG_12, and IMG_13 is controlled according to the control parameter(s) P1. In this embodiment, the image capture circuit 104 may use different exposure settings for obtaining the images IMG_11, IMG_12, and IMG_13, respectively. For example, the image IMG_11 is captured under a first exposure time (first shutter speed), the image IMG_12 is captured under a second exposure time (second shutter speed), and the image IMG_13 is captured under a third exposure time (third shutter speed). The first exposure time is shorter than the second exposure time, and the second exposure time is shorter than the third exposure time. That is, the first shutter speed time is faster than the second shutter speed, and the second shutter speed is faster than the third shutter speed.

At step 418, the strobe device 102 operates under a strobe intensity setting S4 that is different from the strobe intensity setting S3. For example, a "MAIN FLASH OFF" mode is enabled, and the strobe device 102 does not emit light. Specifically, the strobe device 102 does not emit the main flash due to the strobe intensity setting S4 being a zero value. At step 420, the image capture circuit 104 captures at least one image (e.g., a single image IMG_2) while the strobe device 102 is operating under the strobe intensity setting S4 (e.g., "MAIN FLASH OFF" mode), where capture of the image IMG_2 is controlled according to the control parameter(s) P2. For example, the image IMG_2 is captured under a fourth exposure time (fourth shutter speed). The fourth exposure time is longer than the third exposure time. That is, the fourth shutter speed is slower than the third shutter speed.

Figure 6:
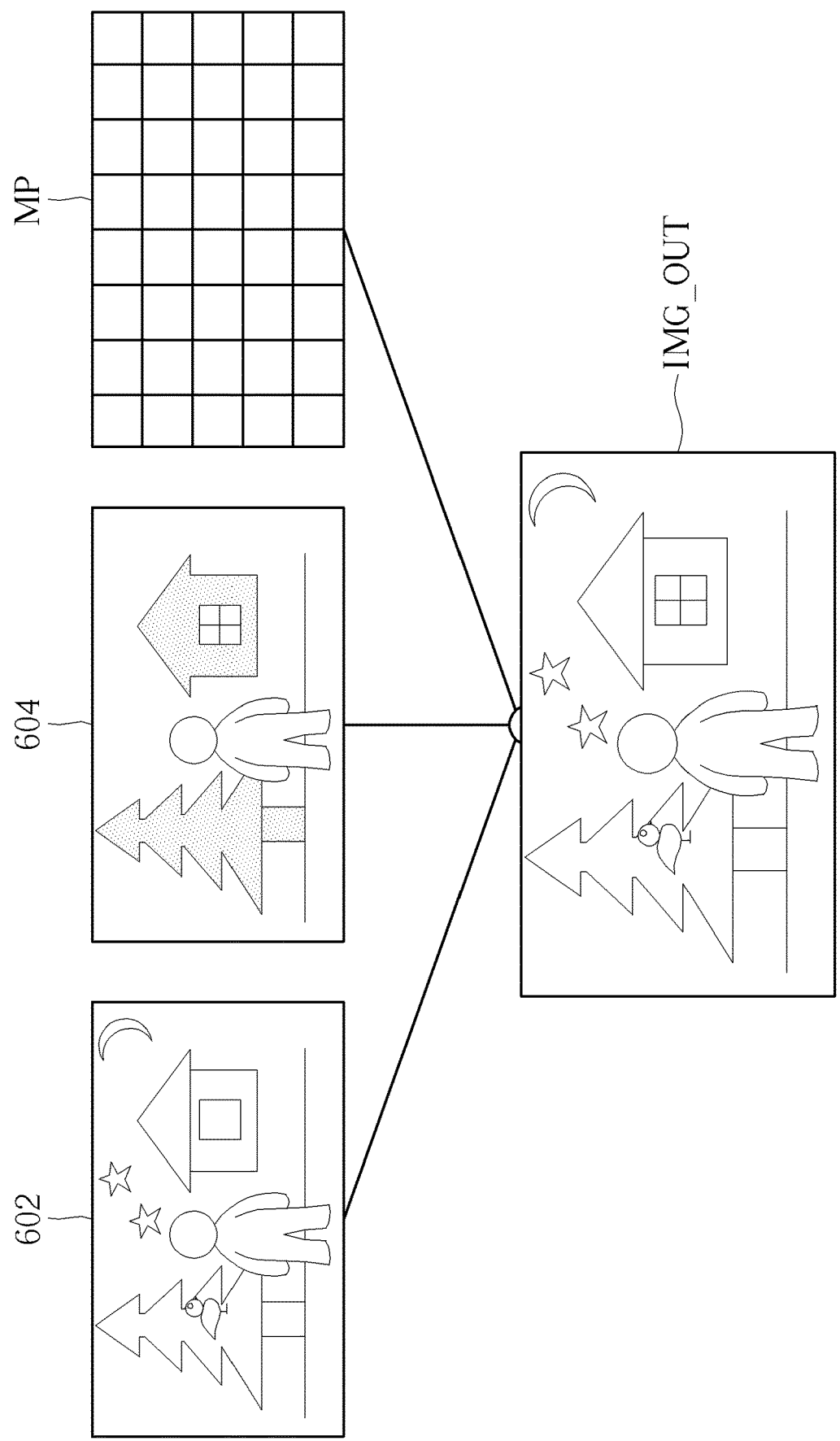
FIG. 6 is a diagram illustrating an output image that is generated from blending one image captured under a "MAIN FLASH ON" mode and one image captured under a "MAIN FLASH OFF" mode according to an embodiment of the present invention.

At step 422, the data processing circuit 106 blends part or all of the images IMG_11-IMG_13 and IMG_2 to generate an output image IMG_OUT. For example, the data processing circuit 106 selects image(s) from images IMG_11-IMG_13 (which are captured with short and mediate exposure time under a condition that the strobe device is emitting the main flash), and refer to information provided by the map MP to blend the selected image(s) (which are captured with short/mediate exposure time under a condition that the strobe device is emitting the main flash) and the single image IMG_2 (which is captured with long exposure time under a condition that the strobe device is not emitting the main flash) for generating an HDR image with low motion blur as the output image IMG_OUT. FIG. 6 is a diagram illustrating the output image IMG_OUT that is generated from blending one image captured under a "MAIN FLASH ON" mode and one image captured under a "MAIN FLASH OFF" mode according to an embodiment of the present invention. The user may use the smartphone 200 to perform flash photography upon the low light scene 302, as illustrated in FIG. 3. Since the image 602 is captured with long exposure (slow shutter speed) under the "MAIN FLASH OFF" mode, details of dim background objects 306, 308, 310, 312, 314 are clear in the image 602, and details of the dim part 318 of the background object 315 are clear in the image 602. However, details of the bright part 317 of the background object 316 in the image 602 are unclear due to overexposure.

Since the image 604 is captured with short exposure (fast shutter speed) under the "MAIN FLASH ON" mode, details of the bright part 317 of the background object 316 in the image 604 are clear. However, the dim background objects 308, 310, 312, 314 are not present in the image 604, details of the dim background object 306 are unclear in the image 604, and details of the dim part 318 of the background object 316 are unclear in the image 604. Compared to the image 602 captured using long exposure (slow shutter speed), the image 604 captured using short exposure (fast shutter speed) has less motion blur or has no motion blur.

With information recorded in the map MP that is derived from images captured under "PRE-FLASH ON" mode and "PRE-FLASH OFF" mode, pixels of the same foreground object in multiple exposure images 602 and 604 can be properly blended, and pixels of the same background object in multiple exposure images 602 and 604 can be properly blended. Considering a case where the map MP is a depth map, the blending process may include taking an average of two or more pixel points, summing and normalizing a color attribute associated with each pixel point, determining an RGB vector length which may then be normalized, or combining at least a brighter pixel and a darker pixel based on a function of attributes for each.

At step 424, the data processing circuit 106 outputs the output image IMG_OUT as a flash photography result of the low light scene, where the output image IMG_OUT is a well-lit image in both foreground and background and has low motion blur.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capture method for flash photography, comprising:
   capturing at least one first image while a strobe device is operating under a first strobe intensity setting for emitting main flash;
   capturing at least one second image while the strobe device is operating under a second strobe intensity setting, wherein the second strobe intensity setting is different from the first strobe intensity setting; and
   generating an output image by blending the at least one first image and the at least one second image;
   before the at least one first image and the at least one second image are captured:
      capturing at least one third image while the strobe device is operating under a third strobe intensity setting for emitting pre-flash;
      capturing at least one fourth image while the strobe device is operating under a fourth strobe intensity setting, wherein the fourth strobe intensity setting is different from the third strobe intensity setting; and
      generating a map according to image statistics of the at least one third image and image statistics of the at least one fourth image, wherein the map records image characteristics at different pixel locations;
   wherein generating the output image by blending the at least one first image and the at least one second image comprises:
      blending the at least one first image and the at least one second image according to the map.

2. The image capture method of claim 1, wherein the strobe device operating under the second strobe intensity setting does not emit the main flash.

3. The image capture method of claim 1, wherein the at least one first image comprises a first captured image and a second captured image, and capturing the at least one first image while the strobe device is operating under the first strobe intensity setting comprises:
   using a first exposure setting to obtain the first captured image; and
   using a second exposure setting to obtain the second captured image, wherein the second exposure setting is different from the first exposure setting.

4. The image capture method of claim 1, wherein the strobe device operating under the fourth strobe intensity setting does not emit the pre-flash.

5. The image capture method of claim 1, wherein the map is a depth map, a reflection map, an intensity map, or a flow map.

6. The image capture method of claim 1, further comprising:
   before the at least one first image and the at least one second image are captured:
      determining at least one first control parameter and at least one second control parameter according to the image statistics of the at least one third image and the image statistics of the at least one fourth image;

wherein capturing the at least one first image while the strobe device is operating under the first strobe intensity setting comprises:

controlling capture of the at least one first image according to the at least one first control parameter; and capturing the at least one second image while the strobe device is operating under the second strobe intensity setting comprises:

controlling capture of the at least one second image according to the at least one second control parameter.

7. The image capture method of claim 6, wherein the strobe device operating under the fourth strobe intensity setting does not emit the pre-flash.

8. The image capture method of claim 6, wherein each of the at least one first control parameter and the at least one second control parameter comprises at least one of an exposure, a gain, a strobe intensity, a strobe color, and a strobe time.

9. The image capture method of claim 1, wherein the output image is a high dynamic range (HDR) image.

10. An image capture system for flash photography, comprising:

an image capture circuit, arranged to capture at least one first image under a first strobe intensity setting of main flash, and capture at least one second image under a second strobe intensity setting of the main flash, wherein the second strobe intensity setting is different from the first strobe intensity setting; and a data processing circuit, arranged to generate an output image by blending the at least one first image and the at least one second image;

wherein before the at least one first image and the at least one second image are captured, the image capture circuit is further arranged to capture at least one third image under a third strobe intensity setting of pre-flash, and capture at least one fourth image under a fourth strobe intensity setting of the pre-flash, wherein the fourth strobe intensity setting is different from the third strobe intensity setting; and the data processing circuit is further arranged to generate a map according to image statistics of the at least one third image and image statistics of the at least one fourth image, wherein the map records image characteristics at different pixel locations, and the data processing circuit is arranged to blend the at least one first image and the at least one second image according to the map.

11. The image capture system of claim 10, wherein the main flash is not emitted under the second strobe intensity setting.

12. The image capture system of claim 10, wherein the at least one first image comprises a first captured image and a second captured image, and the image capture circuit is arranged to use a first exposure setting to obtain the first captured image, and use a second exposure setting to obtain the second captured image, wherein the second exposure setting is different from the first exposure setting.

13. The image capture system of claim 10, wherein the pre-flash is not emitted under the fourth strobe intensity setting.

14. The image capture system of claim 10, wherein the map is a depth map, a reflection map, an intensity map, or a flow map.

15. The image capture system of claim 10, wherein the data processing circuit is further arranged to determine at least one first control parameter and at least one second control parameter according to the image statistics of the at least one third image and the image statistics of the at least one fourth image; and the image capture circuit is arranged to control capture of the at least one first image according to the at least one first control parameter, and control capture of the at least one second image according to the at least one second control parameter.

16. The image capture system of claim 15, wherein the pre-flash is not emitted under the fourth strobe intensity setting.

17. The image capture system of claim 15, wherein each of the at least one first control parameter and the at least one second control parameter comprises at least one of an exposure, a gain, a strobe intensity, a strobe color, and a strobe time.

18. The image capture system of claim 10, wherein the output image is a high dynamic range (HDR) image.

* * * * *